Figure 1:
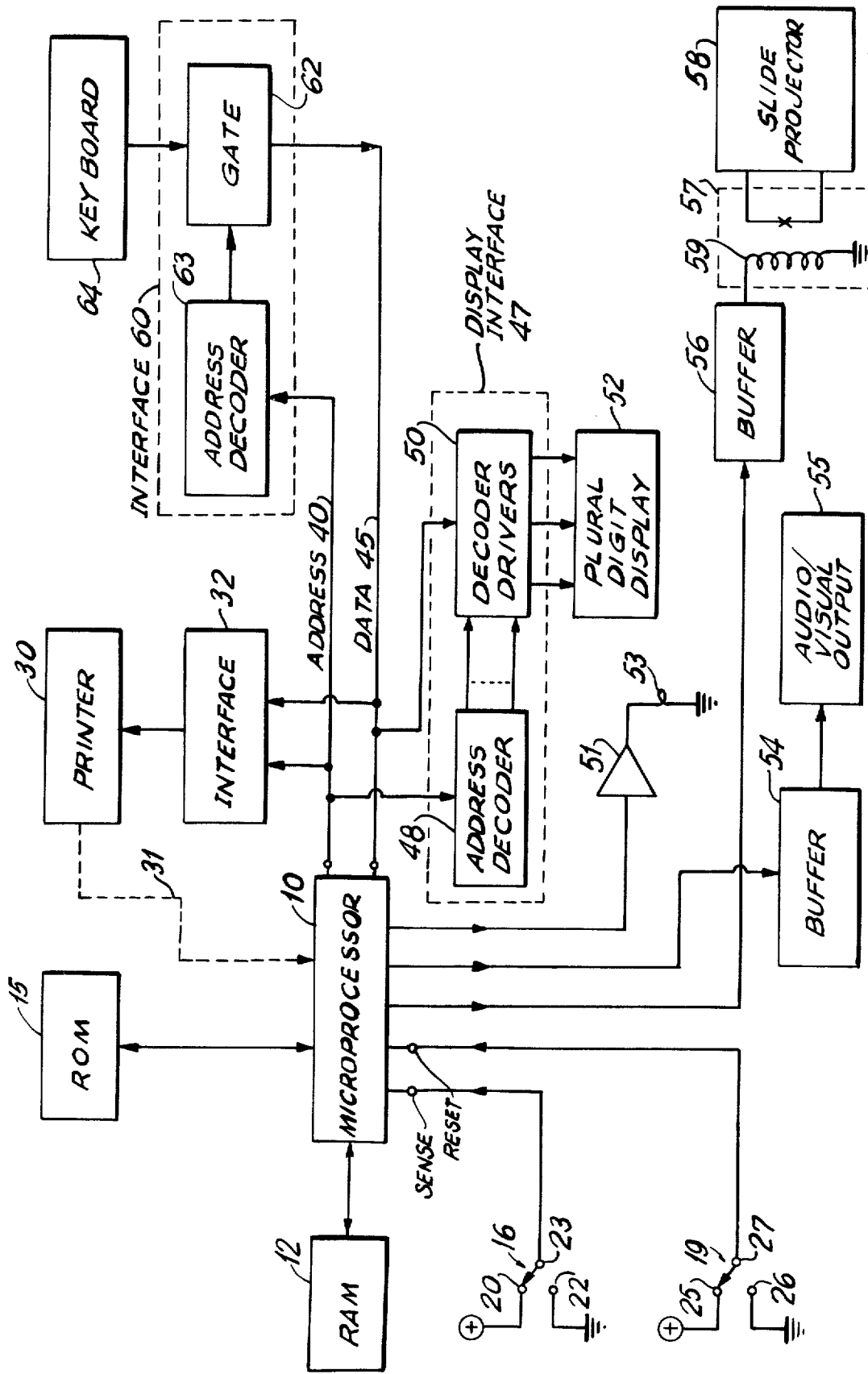

United States Patent [19]

Adelson et al.

[11] 4,234,933
[45] Nov. 18, 1980

[54] ELECTRICAL GAME, POLLING AND TESTING APPARATUS

[75] Inventors: Alexander M. Adelson, Peekskill; Stephen C. Gulick, Flushing, both of N.Y.; Arnold L. Grubin, Teaneck, N.J.

[73] Assignee: Dimensional Communications, Inc., Northvale, N.J.

[21] Appl. No.: 941,934

[22] Filed: Sep. 13, 1978

[51] Int. Cl.³ .............................................. G06F 3/14
[52] U.S. Cl. ..................................... 364/900; 35/9 B; 340/711; 364/120; 364/518
[58] Field of Search ............ 364/900, 514, 515, 518, 364/120, 419; 340/711, 718; 35/9 R, 9 A, 9 B

[56] References Cited

U.S. PATENT DOCUMENTS

| | | | |
|---|---|---|---|
| 3,371,321 | 2/1968 | Adams | 364/900 |
| 3,829,844 | 8/1974 | Zonneveld et al. | 364/900 |
| 4,032,897 | 6/1977 | Pooley | 364/900 |
| 4,107,784 | 8/1978 | Van Bemmelen | 364/900 |

*Primary Examiner*—Errol A. Krass
*Attorney, Agent, or Firm*—Hopgood, Calimafde, Kalil, Blaustein & Lieberman

[57] ABSTRACT

Interactive electronic polling/testing/didactic apparatus employs a microprocessor having fixed (ROM) and variable (RAM) memory connected thereto. A sequence of output visual messages are provided under microprocessor control.

A user actuated input device, e.g., a keyboard, enters a user reaction to the visual material presented. The user responses are accumulated, and reported as via a digital printer. The response significance varies with application, and may represent for example, game results, preferences, opinion in a sampling or polling context, or educational achievement.

10 Claims, 2 Drawing Figures

ELECTRICAL GAME, POLLING AND TESTING APPARATUS

This invention relates to interactive electronic apparatus and, more specifically, to flexible electronic apparatus which may be employed as one or more of a game, for user polling or testing, or for message delivery, reinforcement or other didactic purposes.

It is an object of the present invention to provide improved electronic apparatus permitting interaction between a user input device such as a keyboard, and output graphics, and which can also measure and report on user performance, understanding and/or preferences.

It is a further object of the present invention to provide electronic sampling, polling or didactic apparatus which is program controlled, and wherein the purposes for which the equipment is used can be readily changed.

The above and other objects of the present invention are realized in specific, illustrative interactive electronic polling/testing/educational apparatus employing a microprocessor having fixed (ROM) and variable (RAM) memory connected thereto. A sequence of output visual messages are provided under microprocessor control.

A user activated input device, e.g., a keyboard, enters a user reaction to the visual material presented. The user responses are accumulated, and reported as via a digital printer. The response significance varies with application, and may represent, for example, game results, preference sampling, educational test achievement or level, or the like.

Figure 2:
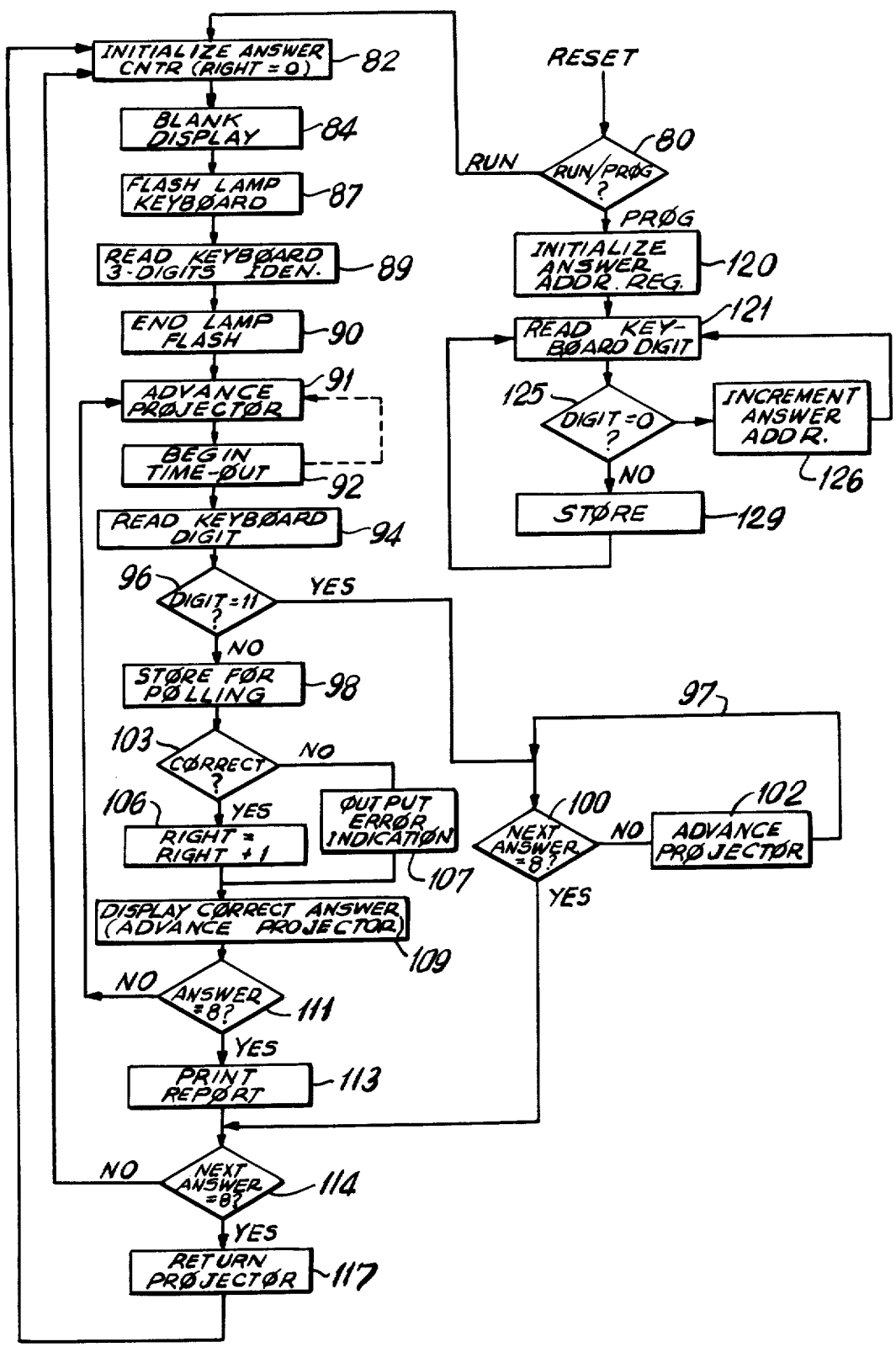

The above and other features and advantages of the present invention will become more clear from the following detailed description of a specific illustrative embodiment thereof, presented hereinbelow in conjunction with the accompanying drawing in which:

FIG. 1 is a block diagram of specific illustrative interactive electronic polling/testing/teaching apparatus embodying the principles of the present invention; and FIG. 2 is a flow chart depicting operation of the apparatus of FIG. 1.

Referring now to FIG. 1, there is shown specific, illustrative apparatus which may be flexibly programmed and applied to various interactive applications, i.e., where a user of the equipment interacts with a sequence of visual displays confronting him. The sequential displays may be provided, for example, by a slide projector 58 of a kind adapted to present for viewing a different and successive slide each time normally open control contact 61 thereof are momentarily closed. One such projector 58 commonly in use is a so called CAROUSEL (TM) unit offered by Eastman Kodak Company, Rochester, N.Y. The apparatus includes as a central controlling member a microprocessor 10 of any kind, e.g., the unit offered under the style SC/MP by National Semiconductor Corporation, Santa Clara, California.

Operatively connected to the microprocessor 10 are a read only memory (ROM) 15 of fixed stored program instruction content and a read/write memory 12 of variable content. The microprocessor 10 is connected in per se normal common bus fashion to an address bus 40 and a data bus 45 having several elements (described hereinbelow) connected thereto for bilateral access and communication and control by the microcompressor. As a first matter, a keyboard 64 is selectively connected to the data bus 45 through a gate 62 of a keyboard interface circuit 60 of any conventional type. Thus the interface 60 may comprise an address decoder 61 (combinational coincidence logic in its simplest form) connected to the address bus 40 for enabling gate 62 when keyboard 64 is serviced by microprocessor 10. That is, the address decoder includes coincidence gates for recognizing its particular identification code when microcompressor 10 addresses the keyboard 64 by impressing such unique identification number on the address bus 40. When the keyboard 64 is so interrogated, address decoder 63 is enabled and activates gate 62 to pass the information present at the keyboard 64 output lines onto the data bus 45. Alternatively, interface 60 may be of per se available form such as a p.i.a. device.

Also connected to the buses 40 and 45 is display interface circuitry 47 which supplies information to a plural digit display 52, e.g., a set of three alpha-numeric display tubes or display semiconductor elements as of the multi-segment or cold cathode types. Many embodiments for the display interface 47 are well known to those skilled in the art for all specific display elements. Such interface may again comprise a conventional p.i.a. The particular implementation shown in the drawing comprises an address decoder 48 for recognizing that the microprocessor 10 has information for the display 52. Upon recognizing that the microprocessor 10 is so supplying information on the data bus 45 destined for the display digits 52, the address decoder 48 is enabled and loads information into plural digit register 50 which may advantageously also comprise decoder and driver portions for driving each digit of the display 52.

Similarly, a printer 30 is connected to the address and data buses 40 and 45 via a printer interface e.g., p.i.a. or address decoding gate and register. The particular structure of the interface 32 will depend on the type of printer 30 in the manner per se known. Thus in one form, the interface 32 is loaded with the BCD information for each column of the printer 30, together with a print command. The printer responds to these signals by generating an output impression corresponding to the BCD information supplied thereto. For alternate forms of printing such as those printers employing constantly rotating wheels which print "on the fly", printer status data instantaneous wheel position (e.g., incidences of a reference position and indexing advancement of the print wheels) is coupled directly to sense input ports of the microprocessor 10 as indicated by the dashed bus line 31 in the drawing. For such a printer, the data bus 45 loads into the interface 32 binary signals which directly control the column printing hammers of the printer at appropriate times (and, in general, different times).

Further included in the organization of FIG. 1 as output elements controlled by the microprocessor 10, is a lamp 53 driven by a buffer amplifier 51. Lamp 53 generates a flashing visual indication about the display digits 52 when a reaction or keyboard input is required of a user of the equipment. Similarly, a buffer/driver 54 is employed to activate a further audio and/or visual output indicator 55, e.g., a buzzer, when desired. This may be done, for example, when a "wrong" answer to a visual inquiry is signalled by the user at the keyboard 64.

Finally, control switches 16 and 19 are respectively connected to sense and reset input ports of the microcompressor 10. The switch 16 and 19 transfer members 23 and 27 normally engage lower, grounded contacts 22 and 26 during normal operation of the apparatus. The switches 16 and 19 are adapted to be controlled by a key or other secured control, and are operated only by the entity or proprietor controlling the environment of the composite FIG. 1 apparatus vis-a-vis a normal user of the equipment when it is in service. In particular, the switches 16 and 19 are employed to enter program information into the variable RAM memory 12 when the switch 16 is put in its upper position, and when the switch 19 is momentarily placed in its upper position.

With the above structural aspects of the instant invention in mind and before proceeding with a detailed analysis of the FIG. 2 flow chart showing the particular mode of operation of the FIG. 1 apparatus, the equipment of the present invention will first be discussed in general, functional overview. The slide projector 58 contains an array of slide and starts from an initial position. In a typical application, some of the slides will present information, while others of the slides will ask questions to which a numeric response will be entered by a user at the keyboard 64. Thus, in a consumer polling application, certain of the slides will bear an educational or sponser-related message, while others of the slides will ask questions to sample user purposes. In an educational context, a portion of the slide will convey information, while others of the graphical presentations created by the slides test the viewers comprehension of the previously presentation. For present purposes, the educational application will be discussed since it is perhaps the most encompassing in exercising the aspects of the present invention.

The correct answers to those of the slides which comprises inquiries of the users are stored in sequence in the RAM memory 12—as in storage cells denoting ANSWER. The answers are stored in the ANSWER memory cells in the order in which the corresponding questions are posed by the slides in the projector 58.

In a typical sequence of use, a user will first enter his identification number via keyboard 64 when asked to do so by a flashing message or first slide in the slide projector 58. The slides in the projector 58 will advance under control of contacts 57 effected by microprocessor 10 conveying one or more educational message passages. A time will then arrive when the next slide presented by the projector 58 poses a question for the user, e.g., a multiple choice type question in which a user must select an answer by depressing at the keyboard 64 that key which in his view provides a correct response to the question posed. The response is entered by the microprocessor 10 and then compared with the pre-programmed answer stored in the corresponding ANSWER cell in the RAM 12. In a test context, each correct answer will be used to implement by one a memory 12 storage variable which accumulates the correct answers ("RIGHT" employed as the variable name.)

After the answer is entered and its accuracy determined, the projector 58 indexes one position (optionally to show the correct answer in a teaching reinforcement mode) and further indexes in accordance with the particular visual program desired until the next question is posed of the reader.

This operation continues until a special character (e.g., the number "8") is read from the memory 12 in the next ANSWER location at which point the program reverts to an initialized status. If one program only is utilized, the microprocessor cycles the projector 58 back to its initial position. If plural separate program or subprogram segments are employed, the slide projector 58 is merely indexed to the next following slide which begins the next ordered program segment.

Following each program or program segment, output information is supplied by the microprocessor 10 from the RAM 12) indicative of performance during the previous program or program segment—as by reporting via the printer 30. In the testing context, the output report may simply comprise user identification number and the number of correct answers. In a polling or consumer preference type of application, the output printer would print the responses in accordance with the varying categories of information requested.

It is observed that the application of the equipment of the composite FIG. 1 equipment thus depends on (1) the particular slides loaded into the slide projector 58; and (2) the answers loaded into the ANSWER array of memory cells in the RAM 12. The slides may be rapidly changed by simply either substituting an entire carrier tray or the like, or by replacing slides within a slide holder; and the correct answers in the RAM 12 changed by simply operating the key switches 16 and 19, and entering suitable information into the RAM via keyboard 64. Thus the FIG. 1 apparatus may be applied to completely distinct and divergent tasks very rapidly.

With the above functional overview in mind attention will now be directed to the flow chart of FIG. 2 to describe the particular operation of the FIG. 1 apparatus. No particular coding or program language will be employed, it being readily understood to those skilled in the art that virtually any computer or assembly language may be employed or, for that matter, direct machine language.

As a first matter in the FIG. 2 flow chart, an external command (created by actuation of the key switch 19 such that the transfer contact 27 momentarily engages contact 25) initializes the program to a starting (RESET) state comprising a branching operating 80. Program control (and the program as above discussed is fixed and contained in the ROM 15) and branches depending upon whether or not the other switch 16 is in a programming state (transfer contact 23 engaging contact 20) to load the RAM 12 ANSWER address for answers and the like; or is in a RUN state with transfer contact 23 connected grounded contact 22. Assume first as a conceptual matter that the subject FIG. 1 apparatus must be programmed, and that the switch 16 is activated to supply a positive voltage to microprocessor 10 when switch 19 is momentarily actuated. Accordingly, under stored program control from ROM 15, operation 120 initializes an ANSWER address register to the RAM memory address of the first storage cell in the group of ADDRESS storage locations in RAM 12. The contents of this first answer location are read out and appear at the digital display 52. The operator (proprietor) of the FIG. 1 equipment then enters via keyboard 64 a number which correctly answers the first multiple choice question to be posed of the user for the subject video slide presentation. If the number appearing on the display 52 is already correct, the "zero" character on keyboard 64 is depressed.

The "zero" key is employed since in a correcting (as contrasted with a whole new answer ensemble) mode, only a very limited number in the array of ANSWER storage cells requires change. Accordingly by rapidly depressing the zero key, the operator can step to the ANSWER cell requiring adjustment. Further, at least in the multiple choice mode of testing, "zero" need not be used as one of the multiple choice descriptor correct responses.

Assuming the operator while in this programming mode depressed a non-zero key, it is simply entered in the appropriate ANSWER storage address, and is simultaneously displayed at display 52. When the operator confirms by inspection of display 52 that the appropriate answer is so loaded, he depresses the zero key to advance program control to the next following ANSWER cell (operation 126). Some reflection on the loop 125-126-121 of FIG. 2 will show that consecutive actuations of the "zero" simply index microprocessor control through the stored information.

The operation repetitively proceeds in the above manner until all of the answers required of a visual program subroutine or subset is completed. At that point, an arbitrary control character (e.g., an "8") is entered by the keyboard 64 into the next following RAM serial ANSWER address. Assuming the control character is disqualified as a possible answer to a question, the equipment will respond to detecting this "8" by returning the FIG. 1 apparatus to an initial state to await user execution of the next following subroutine or program segment. If two control consecutive characters are encountered, i.e., a second "8", this signals the end of the last program segment (or the end of the first program if the composite apparatus is applied to a single routine). In particular, the slide projector 58 is indexed by microprocessor 10 back to its initial state for the first routine (operations 114 and 117) or to the next subroutine (operation 114) and program control passed to an initial running state (operation 82) to begin a next cycle of operation for the user.

The above description has thus obtained for loading programming information into the RAM 12 to conform the performance of the FIG. 1 equipment to a particular array of slides loaded into the slide projector 58. Following such programming, the switch 16 is returned to the lower RUN position, and the switch 19 is once more momentarily transferred to its vertically upward state, and then returned to lowered position in the drawing. When this switch operation occurs, the branching operation 80 senses that switch 16 is in the RUN position and, accordingly, program control is transferred to a sequence of operation beginning with functional item 82 in FIG. 2. This programming sequence beginning at 82 corresponds to the normal operation for the composite FIG. 1 apparatus—and is a starting point each time a new user addresses the equipment.

As a first matter, a result counter for the operative process is cleared. Thus, in a polling operation, each preferenced category is cleared, while for a testing operation the storage cell (RIGHT) which accumulates the number of right answers during a sequence is initialized to zero. This latter testing case will be assumed for illustration FIG. 2 processing—and obtains following execution of operation 82. There next follows display blanking for the digital display 52 (operation 84) followed by flash-enabling of the flashing lamp 53 via buffer amplifier 51 and a a microprocessor 10 direct drive output port (e.g., a flag bit output). This flashing light on the equipment notifies the user at the console to enter his multi-digit (e.g., three) identification number employing the keyboard 64, which is so interrupted by computer READ operation (functional block 89). After this is completed, the flashing of lamp 53 is terminated (block 90) and the testing cycle adapted to begin.

The microprocessor 10 first advances the slide projector 58 one position by once closing projector contacts 57 as via a signal at a flag bit output port driving a contact closing relay coil 59 via buffer amplifier 56. Assuming the graphics of the slide poses a question, functional block 94 again is a READ operation to enter into the microprocessor 10 the digit(s) excited at keyboard 64 by the resistor which is the first answer to the question posed. At this point a system control branching operation 96 asks whether or not the information read in from the keyboard is a special control character sequence outside of the ordinary ensemble of permissible answers (e.g., the decimal number "11"). The branching instruction 96 is employed solely to permit an operator to reinitialize the equipment to state 82 if the user previously initiating an operative sequence abandons the apparatus in mid execution—as by becoming distracted or otherwise simply walking away from the equipment. Noting this, an attendent presses the keyboard character "11" which causes the branching operation 96 to supply a positive response, causing the apparatus to enter a functional loop 97. This reinitialization comprises (operation 102) stepping through the projector 58 and the ANSWER register address until an end-of-sequence control character ("8") from the RAM is encountered and sensed by branching operation 100. When this occurs, an exit is made from loop 97 back to the main stream of operation.

However for the normal case of the user actually operating the equipment without abandonment, a negative response is made for branching operation 96, i.e., a user will typically enter from the keyboard 64 a proper response other than the control digits "11". When this occurs, the user's response is entered into an appropriate category if a polling operation is employed (functional operation 98). For a testing mode, the next following branching instruction 103 compares the response entered by the user at keyboard 64, as received from functional operation 94, with the stored contents of the corresponding storage cell in the ANSWER storage block from RAM 12. If the response is correct, the correst answer index is incremented by one (functional operation 106—RIGHT=RIGHT+1) if the answer is incorrect, the correct answer accumulator (the storage variable RIGHT) is not incremented—and the appropriate output indication created (functional block 107). For the FIG. 1 apparatus this is generated by an output microprocessor 10 signal supplied to buffer/driver 54 to momentarily turn on the audio and/or visual buzzer/lamp or the like 55.

Following this, if operationally desired, the slide projector 58 is advanced once to the next following slide which in fact displays the correct answer, possibly, with some further illucidating text and/or commenting upon the reasons why several of the alternative answers were incorrect or less desirable. Similarly, in a polling mode, any desired textual presentation may be made by the next following slide commenting upon the various choice, or presenting any point of view which the operator of the FIG. 1 equipment wishes to make known to the user.

This ends the sequence of operation precipitated by the particular factual proposition presented by the slide text in view following the functional operation 91. The branching operation 111 examines the contents of the next following ANSWER storage cell to determine whether or not it contains the end-of-subroutine control character "8". If it does not ("no" response), program control returns to again execute the operational sequence beginning with operation 91, i.e., to once again advance the CAROUSEL projector or the like to examine the next following question posed in the manner identically paralleling that above discussed. Assuming, however, that the "8" control character is read from the interrogated ANSWER array cell, this signals the end of the subroutine which may or may not be the last subroutine, of the entire slide program. At the end of the subroutine, functional operation 113 prints out the report on the user's performance during the subrouting just executed. Again for the testing operation, this may simply comprise user's identification number and the number of right answers (the contents of storage location RIGHT). For a polling mode, the particular report would be the user's identification number, and preferences by functional category.

The branching instruction 114 next looks at the contents of the next following ANSWER storage sequence for the presence of the second sequencer control character "8". If it is not encountered, this signifies that the subrouting just completed was not the final program portion. Accordingly, program control again goes to the initial waiting state 82 to accommodate either the same user, or another user, who will execute the next following subroutine. Correspondingly, if test 114 does encounter the second successive "8" control character, this signifies the last subroutine of a sequence (or the first if there is only one routine in the program) has been completed. Accordingly, operation 117 advances the slide projector that number of spaces required to return it to its initial position (e.g., from a variable stored during initial programming as above discussed) and then returns program control to the operational state 82 to await the next user who will then be presented with the first of the program subroutines.

The above described operation thus presents on an interactive basis any number of subroutines, involving any number of slides-per-subroutine, which may vary from subroutine to subroutine. The equipment itself operates on a flexible basis, and may be varied as to its application simply by changing the slides in the projector 58, and making concomitant changes in RAM storage.

The above described arrangement is merely illustrative of the principles of the present invention. Numerous modifications and adaptations thereof will be readily apparent to those skilled in the art without departing from the spirit and scope of the present invention. Thus, for example, the RAM memory 12 may employ a back up power supply or the like to preserve the contents of the ANSWER storage cells in case of momentary power failure.

What is claimed is:

1. In combination, a microprocessor; a read only memory, a variable content memory, an address bus, and a data bus connected to said microprocessor; visual image forming means including means for displaying a sequence of images, and display control means for advancing the image then formed by said image forming means; said image forming means comprising a slide projector containing plural projectable slides, and wherein said display control means comprises a projector-controlling switch to advance the slide then being projected by said slide projector; means controlled by said microprocessor for selectively actuating said display control means; data input means, and interface means connected to said address bus and said data bus for selectively connecting said data input means to said data bus; said variable content memory including plural answer data storage means in one-to-one correspondence with at least a subset of said images; and means for loading said answer data storage means employing said data input means.

2. a combination as in claim 1 further comprising data output means connected to said address bus and data bus.

3. A combination as in claim 2 wherein said data output means comprises a digital printer.

4. A combination as in claim 1 further comprising an alphanumeric display, and interface means connecting said alphanumeric display with said data bus and said address bus.

5. A combination as in claim 1 further comprising audio/visual output means, and means responsive to said microprocessor for energizing said audio/visual output means.

6. A combination as in claim 1 wherein said date input means comprises a keyboard, wherein said microprocessor comprises means for comparing data entered at said keyboard with data stored in said answer data storage means, and wherein said variable content memory includes result storage means for storing the results of the comparisons effected by said comparing means.

7. A combination as in claim 1 wherein said data input means comprises a keyboard, and wherein said answer data storage loading means comprises switch means connected to said microprocessor for translating data from said keyboard to said answer data storage means.

8. In combination, a microprocessor; a read only memory, a variable content memory, an address bus, and a data bus connected to said microprocessor; visual image forming means including means for displaying a sequence of images, and display control means for advancing the image then formed by said image forming means; said image forming means comprising a slide projector containing plural projectable slides, and wherein said display control means comprises a projector-controlling switch to advance the slide then being projected by said slide projector; means controlled by said microprocessor for selectively actuating said display control means, data input means, and interface means connected to said address bus and said data bus for selectively connecting said data input means to said data bus; said variable content memory including at least one result storing means; and means for selectively loading said result storage means from said data input means.

9. A combination as in claim 8 further comprising data output means connected to said address bus and data bus.

10. A combination as in claim 8 further comprising an alphanumeric display, and interface means connecting said alphanumeric display with said data bus and said address bus.

* * * * *